(12) United States Patent
Che et al.

(10) Patent No.: US 12,545,111 B2
(45) Date of Patent: Feb. 10, 2026

(54) GLASS ARTICLE FOR AUTOMOTIVE INTERIOR HAVING IMPROVED HEAD FORM IMPACT TESTING PERFORMANCE

(71) Applicant: CORNING INCORPORATED, Corning, NY (US)

(72) Inventors: Kaikai Che, Rochester, NY (US); Khaled Layouni, Fontainebleau (FR); Yousef Kayed Qaroush, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 447 days.

(21) Appl. No.: 18/022,920

(22) PCT Filed: Aug. 16, 2021

(86) PCT No.: PCT/US2021/046065
§ 371 (c)(1),
(2) Date: Feb. 23, 2023

(87) PCT Pub. No.: WO2022/051078
PCT Pub. Date: Mar. 10, 2022

(65) Prior Publication Data
US 2023/0322083 A1    Oct. 12, 2023

Related U.S. Application Data

(60) Provisional application No. 63/073,229, filed on Sep. 1, 2020.

(51) Int. Cl.
*B60K 35/00* (2024.01)
*B60K 35/22* (2024.01)
(Continued)

(52) U.S. Cl.
CPC .............. *B60K 35/60* (2024.01); *B60K 35/22* (2024.01); *B60K 35/50* (2024.01); *B60K 2360/816* (2024.01)

(58) Field of Classification Search
CPC ........ B60K 35/50; B60K 35/60; B60K 35/22; B60K 2360/816
See application file for complete search history.

(56) References Cited

U.S. PATENT DOCUMENTS

2017/0361797 A1    12/2017  Weindorf et al.
2018/0188869 A1*    7/2018  Boggs ................... B60K 35/22
(Continued)

FOREIGN PATENT DOCUMENTS

EP        3257697 A1    12/2017
TW    201927557 A     7/2019
(Continued)

OTHER PUBLICATIONS

Chinese Patent Application No. 202180068391.9, Offie Action dated Apr. 10, 2025, 5 pages (English Translation only), Chinese Patent Office.
(Continued)

*Primary Examiner* — Steven O Douglas
(74) *Attorney, Agent, or Firm* — Daniel J. Greenhalgh

(57) ABSTRACT

Disclosed is a glass article for a vehicle interior system. The glass article includes a glass sheet, a support member, and a mounting element. The glass sheet and the mounting element are disposed on opposite sides of the support member. The support member has a first Young's modulus ($E_1$) in GPa and a first yield strength ($Y_1$) in MPa in which $E_1 \geq 471.288 \ast \exp(-0.0294 \ast Y_1)+10$ for a first yield strength ($Y_1$) from 39 MPa to 520 MPa and in which $E_1 \leq 1.941e5 \ast \exp(-0.0336 \ast Y_1)+48$ for a first yield strength ($Y_1$) from 223 MPa to 520. Further, the mounting element (Continued)

has a second Young's modulus ($E_2$) in GPa and a second yield strength ($Y_2$) in MPa in which $E_2 \geq 605.1203*\exp(-0.0303*Y_2)+3.9$ for a second yield strength ($Y_2$) from 10 MPa to 950 MPa and in which $E_2 \leq 765.0928*\exp(-0.0094*Y_2)+85$ for a second yield strength ($Y_2$) from 78 MPa to 950 MPa.

20 Claims, 9 Drawing Sheets

(51) Int. Cl.
    *B60K 35/50* (2024.01)
    *B60K 35/60* (2024.01)

(56) References Cited

U.S. PATENT DOCUMENTS

| | | |
|---|---|---|
| 2020/0123050 A1 | 4/2020 | Black et al. |
| 2020/0201397 A1 | 6/2020 | Demartino et al. |
| 2020/0269551 A1 | 8/2020 | Black et al. |
| 2021/0370774 A1* | 12/2021 | Badar ................. B60R 11/0235 |

FOREIGN PATENT DOCUMENTS

| | | |
|---|---|---|
| TW | 202028030 A | 8/2020 |
| WO | 2020/041015 A1 | 2/2020 |
| WO | 2020/081407 A1 | 4/2020 |
| WO | 2020/081488 A1 | 4/2020 |

OTHER PUBLICATIONS

Taiwanese Patent Application No. 110130598, Office Action dated Feb. 24, 2025, 2 pages (English Translation only), Taiwanese Patent Office.
R. Deiterding et al., "A Virtual Test Facility for Simulating Detonation- and Shock-Induced Deformation and Fracture of Thin Flexible Shells", International Journal for Multiscale Computational Engineering, vol. 5, No. 1, Oct. 2007, pp. 1-17.

* cited by examiner

GLASS ARTICLE FOR AUTOMOTIVE INTERIOR HAVING IMPROVED HEAD FORM IMPACT TESTING PERFORMANCE

BACKGROUND

This application claims the benefit of priority under 35 U.S.C. § 371 of International Application No. PCT/US2021/046065, filed on Aug. 16, 2021, which claims the benefit of priority under 35 U.S.C. § 119 of U.S. Provisional Application Ser. No. 63/073,229, filed on Sep. 1, 2020, the content of which are relied upon and incorporated herein by reference in their entirety.

BACKGROUND

The disclosure relates to glass articles for vehicle interior systems and, more particularly, to glass articles configured to meet headform impact testing requirements.

Vehicle interiors include curved surfaces and can incorporate displays in such curved surfaces. The materials used to form such curved surfaces are typically limited to polymers, which do not exhibit the durability and optical performance as glass. As such, curved glass substrates are desirable, especially when used as covers for displays. Existing methods of forming such curved glass substrates, such as thermal forming, have drawbacks including high cost, optical distortion, and surface marking. Accordingly, Applicant has identified a need for vehicle interior systems that can incorporate a curved glass substrate in a cost-effective manner and without problems typically associated with glass thermal forming processes.

SUMMARY

According to an aspect, embodiments of the disclosure relate to glass article for a vehicle interior system. The glass article includes a glass sheet having a first major surface and a second major surface. The second major surface is opposite to the first major surface. The glass article also includes a support member having a first support surface and a second support surface. The second support surface is opposite to the first support surface. The glass sheet is disposed on the first support surface. The glass article additionally includes a mounting element disposed on the second support surface of the support member. The support member has a first Young's modulus ($E_1$) in GPa and a first yield strength ($Y_1$) in MPa in which $E_1 \geq 471.288*\exp(-0.0294*Y_1)+10$ for a first yield strength ($Y_1$) from 39 MPa to 520 MPa and in which $E_1 \leq 1.941e5*\exp(-0.0336*Y_1)+48$ for a first yield strength ($Y_1$) from 223 MPa to 520. Further, the mounting element has a second Young's modulus ($E_2$) in GPa and a second yield strength ($Y_2$) in MPa in which $E_2 > 605.1203*\exp(-0.0303*Y_2)+3.9$ for a yield strength ($Y_2$) from 10 MPa to 950 MPa and in which $E_2 \leq 765.0928*\exp(-0.0094*Y_2)+85$ for a yield strength ($Y_2$) from 78 MPa to 950 MPa.

According to another aspect, embodiments of the disclosure relate to a glass article for a vehicle interior system. The glass article includes a glass sheet having a first major surface and a second major surface in which the second major surface is opposite to the first major surface. The glass article also includes a support member having a first support surface and a second support surface in which the second support surface is opposite to the first support surface. The glass article additionally includes a mounting element disposed on the second support surface of the support member. When the glass article is subjected to headform impact testing according to FMVSS 201, the headform does not exceed 80 g deceleration continuously for more than 3 ms, and the glass sheet deflects less than 50 mm when subjected to the headform impact testing.

According to still another aspect, embodiments of the disclosure relate to a method of manufacturing a glass article. The glass article includes a glass sheet having a first major surface and a second major surface, a support member having a first support surface and a second support surface, and a mounting element. The method involves the step of adhering the second major surface of the glass sheet to first support surface of the support member. Further, the mounting element is attached to the second support surface of the support member. The support member has a first Young's modulus ($E_1$) in GPa and a first yield strength ($Y_1$) in MPa in which $E_1 \geq 471.288*\exp(-0.0294*Y_1)+10$ for a first yield strength ($Y_1$) from 39 MPa to 520 MPa and in which $E_1 \leq 1.941e5*\exp(-0.0336*Y_1)+48$ for a first yield strength ($Y_1$) from 223 MPa to 520 MPa. Further, the mounting element has a second Young's modulus ($E_2$) in GPa and a second yield strength ($Y_2$) in MPa in which $E_2 \geq 605.1203*\exp(-0.0303*Y_2)+3.9$ for a second yield strength ($Y_2$) from 10 MPa to 950 MPa and in which $E_2 \leq 765.0928*\exp(-0.0094*Y_2)+85$ for a second yield strength ($Y_2$) from 78 MPa to 950 MPa.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification.

BRIEF DESCRIPTION OF THE DRAWINGS

The accompanying drawings incorporated in and forming a part of the specification illustrate several aspects of the present invention and, together with the description, serve to explain the principles of the invention. In the drawings.

DETAILED DESCRIPTION

Reference will now be made in detail to various embodiments of a glass article configured for improved head-form impact testing, examples of which are illustrated in the accompanying drawings. The glass articles described herein include a glass sheet adhered to a support member, and the glass article is configured to be connected to a vehicle interior system using one or more mounting elements. As will be described below, the glass articles are configured for improved head-form impact testing based on balancing Young's modulus and yield strength of the support member and mounting elements. Specifically, the Young's modulus and yield strength are selected so as to prevent breakage of the glass sheet (either from deflection or reaching a limit of maximum principal stress) while also decelerating the head-from in such a manner that the maximum force is not above 80 g for more than 3 ms continuously in duration. The embodiments described herein are provided by way of illustration and not by way of limitation.

In general, a vehicle interior system may include a variety of different curved or flat surfaces, such as display surfaces. Forming such vehicle surfaces from a glass material provides a number of advantages compared to the typical curved plastic panels that are conventionally found in vehicle interiors. For example, glass is typically considered to provide enhanced functionality and user experience in many cover material applications, such as display applications and touch screen applications, compared to plastic cover materials.

Figure 1:
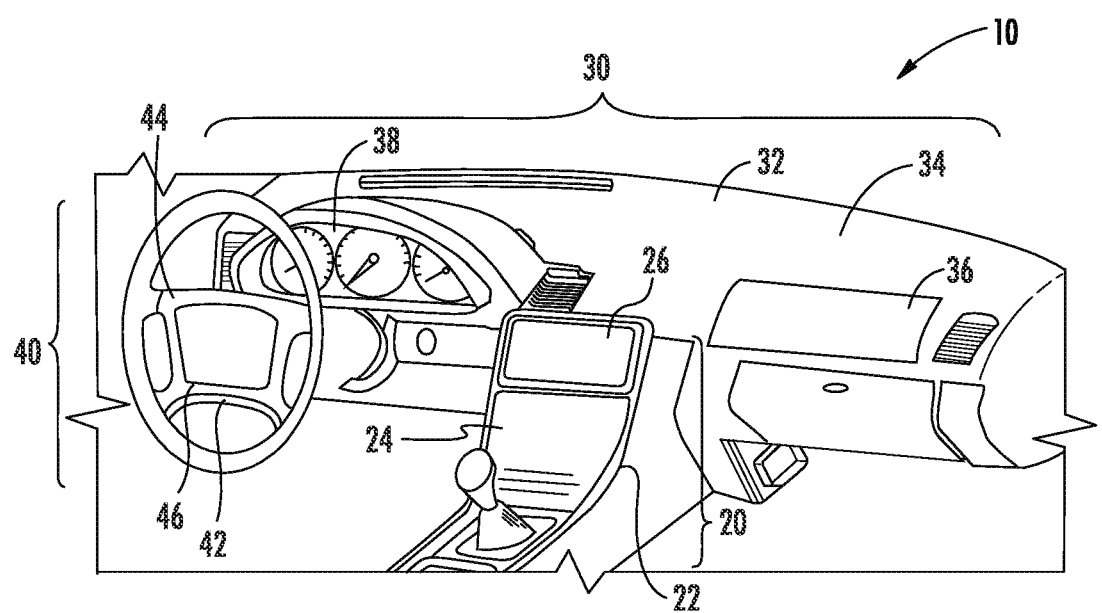
FIG. 1 is a perspective view of a vehicle interior with vehicle interior systems having glass articles, according to exemplary embodiments.

FIG. 1 shows an exemplary interior 10 of a vehicle that includes three different embodiments of vehicle interior systems 20, 30, 40. Vehicle interior system 20 includes a base, shown as center console base 22, with a curved surface 24 including a display 26. Vehicle interior system 30 includes a base, shown as dashboard base 32, with a curved surface 34 including a display 36. The dashboard base 32 typically includes an instrument panel 38 which may also include a display. Vehicle interior system 40 includes a base, shown as steering wheel base 42, with a curved surface 44 and a display 46. In one or more embodiments, the vehicle interior system includes a base that is an arm rest, a pillar, a seat back, a floor board, a headrest, a door panel, or any portion of the interior of a vehicle that includes a curved surface.

The embodiments of the glass articles described herein can be used in each of vehicle interior systems 20, 30, 40, among others. In some embodiments, the glass article discussed herein may include a cover glass sheet that also covers non-display surfaces of the dashboard, center console, steering wheel, door panel, etc. In such embodiments, the glass material may be selected based on its weight, aesthetic appearance, etc. and may be provided with a coating (e.g., an ink or pigment coating) including a pattern (e.g., a brushed metal appearance, a wood grain appearance, a leather appearance, a color appearance, etc.) to visually match the glass components with adjacent non-glass components. In specific embodiments, such ink or pigment coating may have a transparency level that provides for deadfront or color matching functionality when the display 26, 36, 38, 46 is inactive. Further, while the vehicle interior of FIG. 1 depicts a vehicle in the form of an automobile (e.g., cars, trucks, buses and the like), the glass articles disclosed herein can be incorporated into other vehicles, such as trains, sea craft (boats, ships, submarines, and the like), and aircraft (e.g., drones, airplanes, jets, helicopters and the like).

Figure 2A:
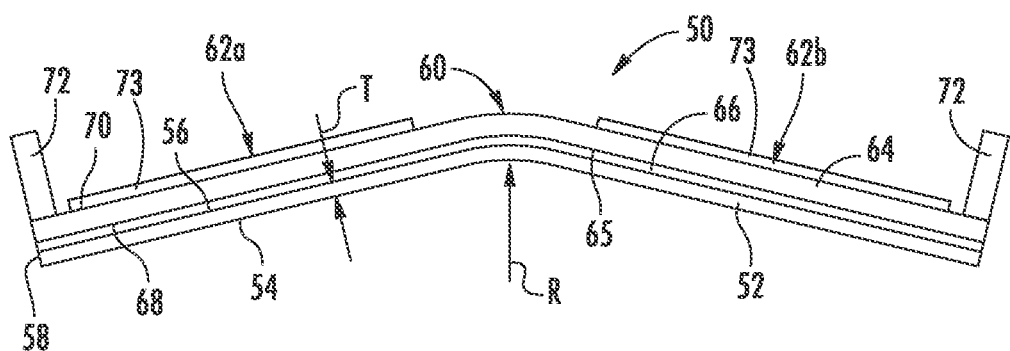
FIG. 2A depicts a side view of a V-shaped glass article, according to an exemplary embodiment.
Figure 2B:
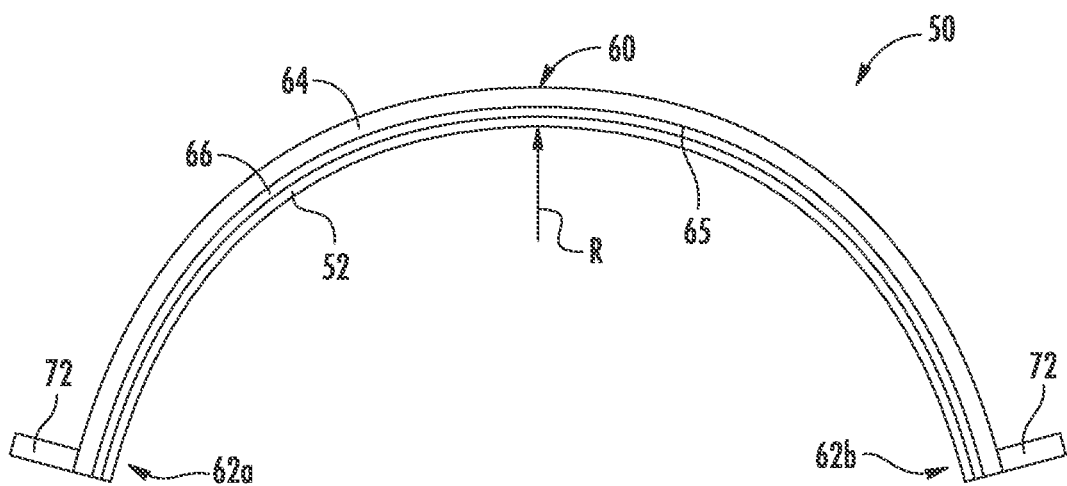
FIG. 2B depicts a side view of a C-shaped glass article, according to an exemplary embodiment.

In embodiments, the curved surfaces 24, 34, 44 can be any of a variety of curved shapes, such as V-shaped or C-shaped as shown in FIGS. 2A and 2B, respectively. Referring first to FIG. 2A, a side view of an embodiment of a V-shaped glass article 50 is shown. The glass article 50 includes a glass sheet 52 having a first major surface 54, a second major surface 56 opposite to the first major surface 54, and a minor surface 58 joining the first major surface 54 to the second major surface 56. The first major surface 54 and the second major surface 56 define a thickness T of the glass sheet 52. In embodiments, the thickness T of the glass sheet 52 is from 0.3 mm to 2 mm, in particular 0.5 mm to 1.1 mm. In a vehicle, the first major surface 54 faces the occupants of the vehicle.

In embodiments, the first major surface 54 and/or the second major surface 56 includes one or more surface treatments. Examples of surface treatments that may be applied to one or both of the first major surface 54 and second major surface 56 include at least one of an anti-glare coating, an anti-reflective coating, a coating providing touch functionality, a decorative (e.g., ink or pigment) coating, or an easy-to-clean coating.

As can be seen in FIG. 2A, the glass sheet 52 has a curved region 60 disposed between a first flat section 62a and a second flat section 62b. In embodiments, the curved region 60 has a radius of curvature R that is from 20 mm to a radius of curvature that is less than substantially flat or planar (e.g., R=10 m). Further, as shown in FIG. 2A, the curved region 60 defines a concave curve with respect to the first major surface 54, but in other embodiments, the curved region 60 is instead a convex curve with respect to the first major surface 54

In the glass article 50 of FIG. 2A, the second major surface 56 of the glass sheet 52 is adhered to a support member 64. In embodiments, the glass sheet 52 is attached to the support member 64 via an adhesive layer 66. In embodiments, the adhesive layer 66 joining the support member 64 to the glass sheet 52 is a structural adhesive, such toughened epoxy, flexible epoxy, acrylics, silicones, urethanes, polyurethanes, pressure-sensitive adhesives, and silane modified polymers. In embodiments, the adhesive layer 66 has a thickness of 2 mm or less between the support member 64 and the glass sheet 52. Further, the support member 64 includes a first support surface 68 and a second support surface 70 opposite to the first support surface 68, and the glass article 50 includes one or more mounting elements 72 connected to the second support surface 70.

As shown in FIG. 2A, the glass article 50 may also include one or more display units 73. In embodiments, the display units 73 are located in the flat sections 62a, 62b. In other embodiments, the display units 73 may be curved and positioned over the curved region 60. In embodiments, the display units 73 are joined to the second major surface 56 of the glass sheet 52 using, e.g., an optically clear adhesive. Further, in embodiments, the support member 64 may include one or more apertures sized to accommodate the display units 73 depending on the size and thickness of the display unit 73; otherwise, the display unit 73 may be disposed between the glass sheet 52 and support member 64. In embodiments, each display unit 73 is at least one of a light-emitting diode (LED) display, an organic LED (OLED) display, a microLED display, a plasma display, a liquid crystal display (LCD), or an organic LCD (OLCD), including any necessary backlight units.

FIG. 2B depicts another embodiment of a glass article 50, in particular a C-shaped glass article 50. As compared to the V-shaped glass article 50 of FIG. 2A, the C-shaped glass article 50 of FIG. 2B has a larger curved region 60 and shorter flat sections 62a, 62b. The V-shape and C-shape are but two examples of curved glass articles 50 that can be created according to the present disclosure. In other embodiments, the glass articles 50 can include curved regions 60 having opposing curvatures to create an S-shape, a curved region 60 followed by a flat section 62a to create a J-shape, and curved regions 60 separated by a flat section 62a to create a U-shape, among others. Additionally and as will be shown in relation to embodiments discussed below, the glass article 50 may be flat.

In embodiments, such as shown in FIGS. 2A and 2B, the glass sheet 52 is formed in such a way that the curved region 60 is not permanent. That is, the glass sheet 52 is deformed elastically and would spring back to a planar, non-curved (i.e., flat) configuration if the glass sheet 52 was not adhered to the rigid support member 64. Thus, the glass sheet 52 is stressed to produce the curvature and remains stressed during the life of the glass article 50. In embodiments where the glass article 50 is curved, such glass articles 50 may be formed by cold-forming techniques. In general, the process of cold-forming involves application of a bending force to the glass sheet 52 while the glass sheet 52 is situated on a process chuck having a curved forming surface, and the glass sheet 52 is bent into conformity with the curved forming surface. Thereafter, the first support surface 68 of the support member 64 is adhered to the second major surface 56 of the glass sheet 52. In embodiments, the adhesive layer 66 joining the support member 64 to the glass sheet 52 is allowed to cure on the process chuck, or in other embodiments, the support member 64 is clipped to the glass sheet 52 so that the adhesive layer 66 can cure off-line (i.e., off the process chuck). The mounting elements 72 may be joined to the support member 64 prior to adhering it to the glass sheet 52, or the mounting elements 72 may be joined to the support member 64 after the support member 64 is adhered to the glass sheet 52.

Advantageously, it is easier to apply surface treatments to a flat glass sheet 52 prior to creating the curvature in the glass sheet 52, and cold-forming allows the treated glass sheet 52 to be bent without destroying the surface treatment (as compared to the tendency of high temperatures associated with hot-forming techniques to destroy surface treatments, which requires surface treatments to be applied to the curved article in a more complicated process). In embodiments, the cold forming process is performed at a temperature less than the softening temperature of the glass sheet 52. In particular, the cold forming process may be performed at room temperature (e.g., about 20° C.) or a slightly elevated temperature, e.g., at 200° C. or less, 150° C. or less, 100° C. or less, or at 50° C. or less.

Figure 3A:
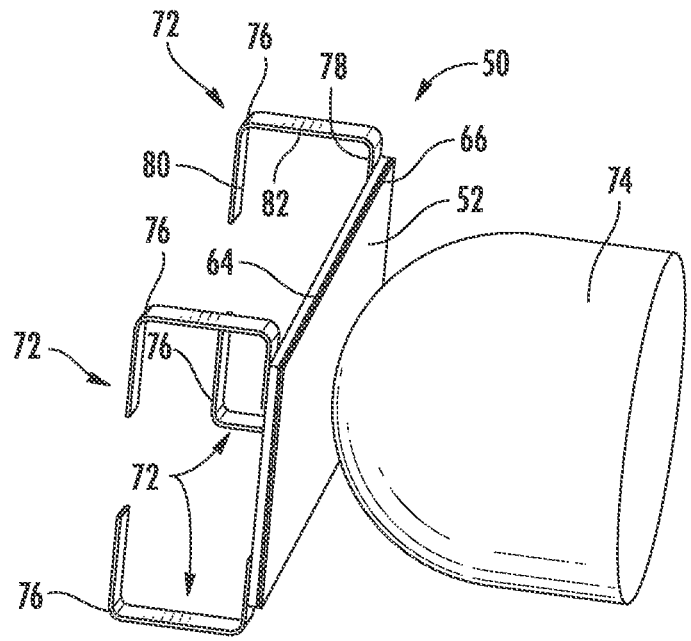
FIG. 3A depicts a glass article undergoing headform impact testing, according to an exemplary embodiment.
Figure 3B:
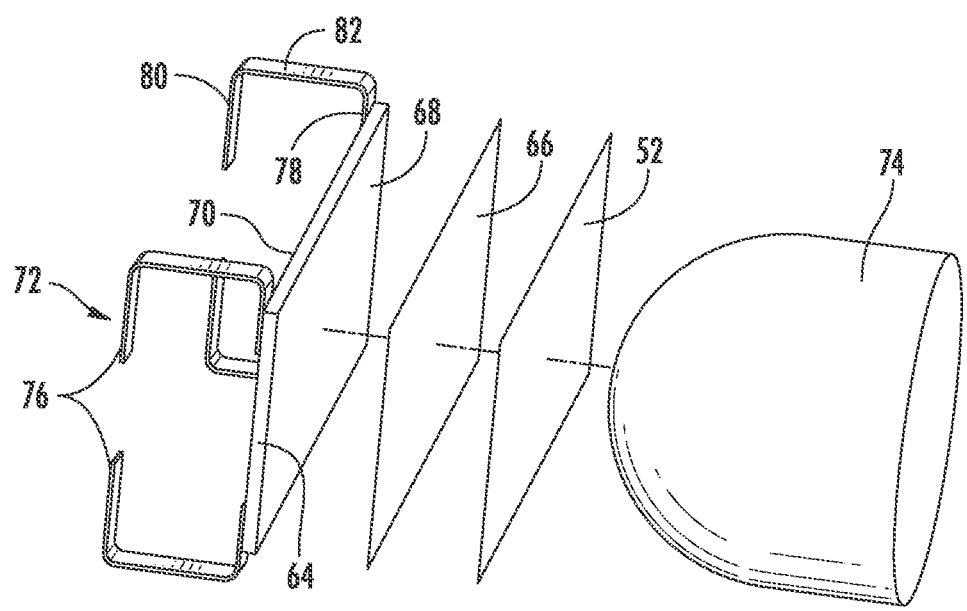
FIG. 3B depicts an exploded view of the glass article of FIG. 5A, according to exemplary embodiments.

Reference with now be made to the glass article 50 depicted in FIGS. 3A and 3B. FIG. 3B depicts an exploded view of the glass article of FIG. 3A. As can be seen in FIGS. 3A and 3B, the glass article 50 is planar (i.e., without curvature), but the discussion related to the glass article 50 applies as well to curved glass articles 50 (such as shown in FIGS. 2A and 2B). The perspective views depicted in FIGS. 3A and 3B also help explain some of the functions associated with the support member 64 and the mounting elements 72. In particular, the mounting elements 72 are configured to engage the vehicle interior base (such as center console base 22, dashboard base 32, and/or steering wheel base 42 as shown in FIG. 1). Additionally, for curved glass articles 50 as shown in FIGS. 2A and 2B, the first support surface 68 of the support member 64 is curved and holds the glass sheet 52 in its curved shape (at least in the curved region 60). Further, the support member 64 and mounting elements 72 are configured to provide sufficient flexural rigidity to support the glass sheet 52 during headform impact testing (HIT). Thus, FIGS. 3A and 3B also depicts a headform 74 such as would be used to perform HIT. The glass article 50 is configured to meet the requirements according to HIT as defined in such standards as FMVSS 201 in North America; ECE R21 in the European Union; and GB 11552 2009 in China.

Specifically, in order to meet the requirements of HIT according to the above references standards, the glass article 50 needs to decelerate a headform (which in embodiments has a weight of 15 lbs. and a diameter of 6.5 inches) in a manner that prevents 80 g of force continuously for more than 3 ms while also preventing the glass sheet 52 from breaking. Breakage can be imparted in two ways. First, the glass sheet 52 can be deflected far enough to cause fracture. Thus, in embodiments, deflection (or intrusion) is maintained at 50 mm or less. Second, the maximum principal stress on the glass sheet 52 can rise above the yield strength of the glass sheet 52, causing the glass sheet 52 to break. In embodiments, the maximum principal stress is maintained below 800 MPa. In general, the two largest contributors to HIT performance are the support member 64 and the mounting elements 72. That is, the support member 64 and mounting elements 72 can be designed in order to provide properties necessary for a given glass sheet 52 to pass HIT, whereas the adhesive layer 66 provides little in terms of Young's modulus or yield strength to contribute to HIT performance.

As will be described herein, HIT performance can be predicted in part from each component's flexural rigidity, which can be determined according to Equation 1, below:

$$D = \frac{ET^3}{12(1-v^2)} \quad (1)$$

in which D is the flexural rigidity, E is the Young's modulus of the material, T is the thickness, and v is Poisson's Ratio of the material. In this regard, flexural rigidity is related to the stiffness, and the stiffness of the glass article 50 can be varied by varying the material properties and/or the geometry of the support member 64 and the mounting element 72. The formula relating flexural rigidity to stiffness is given by Equation 2, below:

$$K = \frac{48Dw(1-v^2)}{l^3} \quad (2)$$

in which K is the stiffness, D is the flexural rigidity, w is the width of the glass article, l is the length of the glass article, and v is Poisson's Ratio. From Equation 1 and Equation 2, it can be seen that the geometry (i.e., particular selection of the width w, length l, and thickness T) and material properties (i.e., Young's modulus) of the glass article 50 has a substantial effect on the flexural rigidity and stiffness. In general the width and length will be dictated by the particular application and customer specifications, leaving the thickness ($D \propto T^3$) and Young's modulus E as likely variables to manipulate to achieve the desired stiffness and flexural rigidity for HIT performance.

By further taking into the yield strength of each component, the design possibilities for the glass article 50 are further enhanced. In particular, consideration of the yield strength for the support member 64 and mounting elements 72 allows for consideration of maximum elastic response of the support member 64 and the mounting elements 72 during HIT.

For improved HIT performance, the particular structure and shape of the support member 64 and mounting elements 72 is not so important as the overall stiffness or flexural rigidity and yield strength of each component. As mentioned above, shape may largely be dictated by the particular aesthetic design requirements, and material selection as discussed below can address the stiffness and flexural rigidity requirements. For example, in the embodiment depicted in FIGS. 3A and 3B, the support member 64 is a backing plate. The stiffness or flexural rigidity of such a support member 64 can be varied, e.g., by varying the material properties (i.e., Young's modulus and/or yield strength) or by varying the thickness. For a backing plate of a given material, such as an aluminum alloy, the stiffness can be varied by, e.g., varying the thickness of the backing plate. In particular, increasing the thickness will increase the stiffness. Further, for a given backing plate thickness, the stiffness can be varied by, e.g., varying the material from which it is made. In particular, the stiffness of the support member 64 will increase as the elastic modulus or yield strength of the material from which it is made increases (e.g., the stiffness will be higher for a steel support member 64 than for an aluminum support member 64 having the same geometry). In embodiments, the support member 64 is made from a metal, plastic, or composite material. Further, in embodiments, the support member 64 is in the form of a backing plate, border frame, or lattice or grid structure. In embodiments, the support member 64 is made of a material and designed in such a way that it provides a stiffness of at least 100 N/mm.

Additionally, in the embodiments depicted in FIGS. 3A and 3B, the one or more mounting elements 72 include a plurality, in particular four, mounting brackets 76. Each mounting bracket 76 is U-shaped having a first arm 78, a second arm 80, and a cross-member 82 joining the first arm 78 and the second arm 80. The first arm 78 is secured (fastened, welded, adhered, interlocked, fitted, etc.) to the second support surface 70 of the support member 64, and the second arm 80 is configured for attachment to a vehicle interior base (such as center console base 22, dashboard base 32, and/or steering wheel base 42 as shown in FIG. 1). In such an embodiment, the stiffness of the mounting elements 72 can be adjusted by varying the thickness of the arms 78, 80 and cross-member 82, by varying the material (i.e., Young's modulus or yield strength) of the brackets 76, the number of brackets 76, the position of the brackets 76, or the shape of the brackets 76. In other embodiments, the mounting elements 72 can be any of a variety of other suitable structures and be made of any of a variety of metal alloys, plastics, composite materials, or a combination of one or more thereof.

In view of the foregoing, simulations were performed for various glass articles 50 having the structure shown in FIGS. 3A and 3B in which the Young's modulus and yield strength were varied for the materials for the support member 64 and the mounting elements 72. For the simulations, the components had the properties shown in Table 1, below.

TABLE 1

Properties of Components involved in HIT Performance Simulations

|  | Glass Sheet 52 | Adhesive Layer 66 | Support Member 64 | Mounting Elements 72 | Headform |
|---|---|---|---|---|---|
| Dimensions (mm) | 151 × 91 × 1.1 | 151 × 91 × 1.0 | 203 × 155 × 3.175 | 3.2 (thickness) | Ø165 |
| Young's Modulus (GPa) | 69.3 | 4.5 × 10⁻³ | Varied | Varied | 71 |
| Poisson's ratio | 0.22 | 0.48 | 0.33 | 0.29 | 0.33 |
| Density (kg/m³) | 2400 | 800 | 2700 | 7850 | 2770 |

Figure 4A:
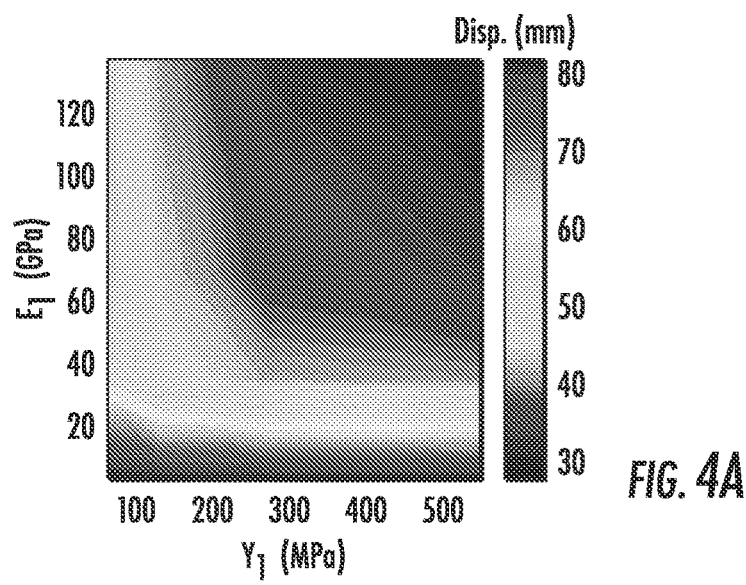
FIGS. 4A-4C depicts head-form impact testing performance based on head-form intrusion, deceleration, and maximum principal stress as a function of yield strength and Young's modulus of a support member of the glass article, according to exemplary embodiments.
Figure 4B:
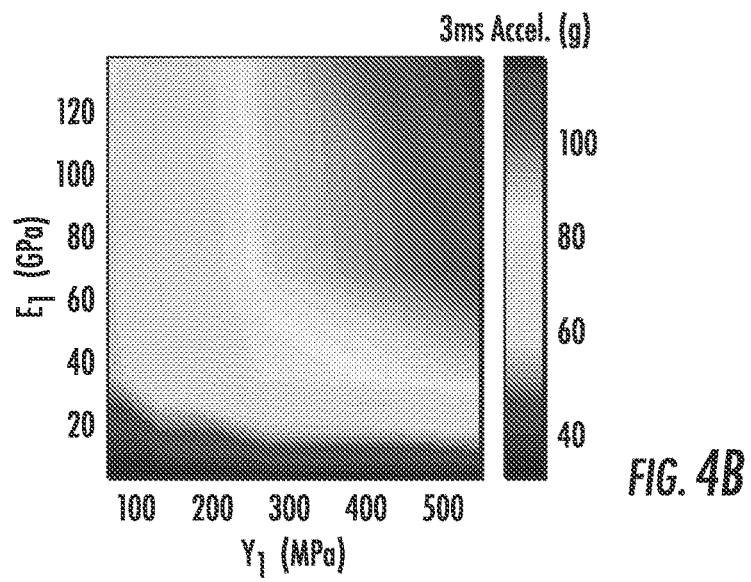
Figure 4C:
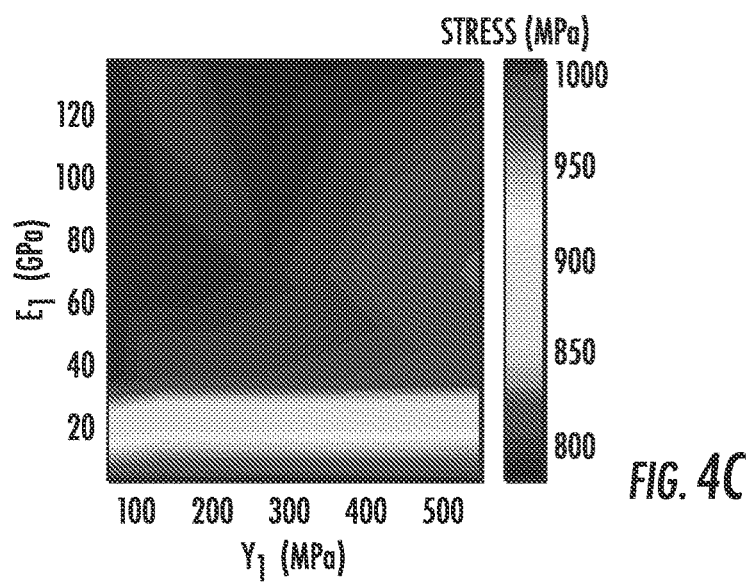

FIGS. 4A-4C model HIT performance factors as a function of yield strength (x-axis) and Young's modulus (y-axis) for the support member 64. For each simulation, the glass article 50 was modeled having steel mounting elements 72 with a stiffness of about 1200 N/mm. FIG. 4A depicts the intrusion of the glass sheet based on the yield strength and Young's modulus. As previously mentioned, intrusion should be kept below 50 mm. FIG. 4A shows that a Young's modulus of about 35 GPa and above tends to keep the intrusion at 50 mm or less. Further, a yield strength of greater than about 125 MPa tends to keep the intrusion at 50 mm or less. Thus, the window of design with respect to the intrusion is the area of the graph to the outside of the intersection of yield strength >125 MPa and Young's modulus >35 GPa.

FIG. 4B depicts the HIT performance factor of maximum force continuously during 3 ms deceleration of a headform. As mentioned previously, the maximum force over 3 ms should be 80 g or less. FIG. 4B demonstrates that the maximum force can be kept below 80 g when the yield strength is less than about 250 MPa with no restriction on the Young's modulus (with respect to the scale depicted). FIG. 4B also demonstrates that the maximum force can be kept below 80 g when the Young's modulus is less than about 35

GPa with no restriction on the yield strength (with respect to the scale depicted). Thus, the window of design with respect to maximum force continuously over 3 ms during deceleration is the area of the graph to the inside of yield strength <250 MPa and Young's modulus <35 GPa.

FIG. 4C depicts the HIT performance factor of maximum principal stress on the glass sheet. As mentioned previously, the maximum principal stress on the glass sheet should kept below 800 MPa. In the graph of FIG. 4C, the maximum principal stress is generally kept below 800 MPa when the Young's modulus is above about 35 GPa.

Figure 5:
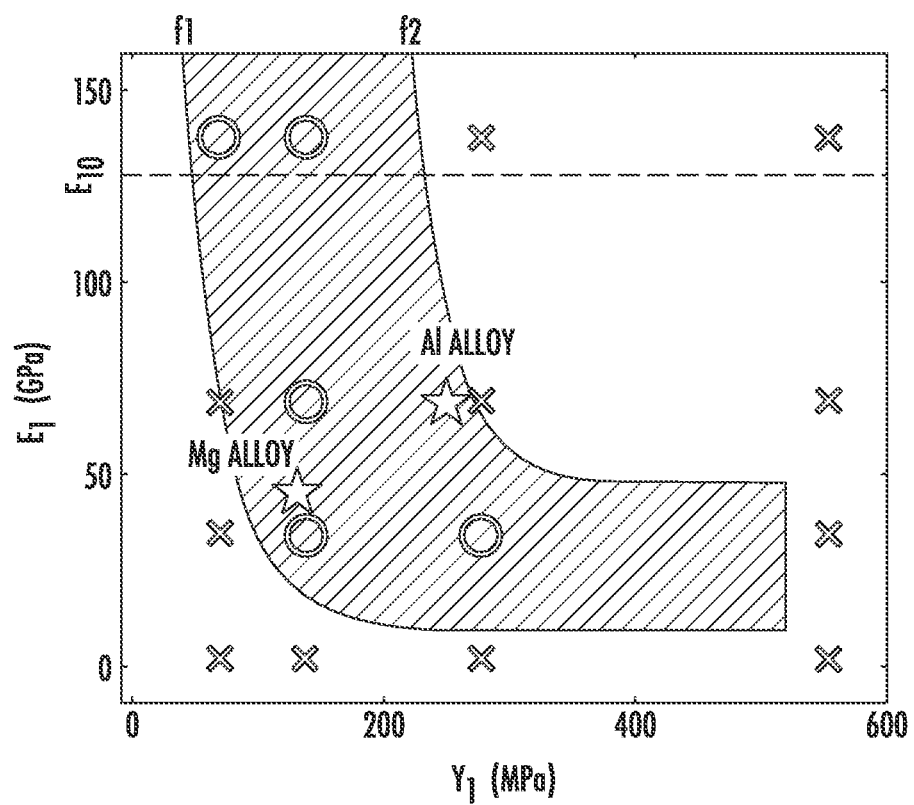
FIG. 5 depicts a graphical representation of a design window for passing head-form impact testing performance for the support member, according to exemplary embodiments.

Using the information generated in FIGS. 4A-4C, the HIT performance of a glass article 50 (as shown in FIGS. 3A and 3B) was simulated for a support member 64 having various combinations of Young's modulus ($E_1$) and yield strength ($Y_1$). FIG. 5 depicts the results of the simulations in which combinations of Young's modulus and yield strength that pass HIT are shown by circles and combinations of Young's modulus and yield strength that do not pass HIT are shown by X's. The shaded area between the two curves f1 and f2 represent the design window in terms of Young's modulus (in GPa) and yield strength (in MPa) for a support member 64 that will pass HIT, including without glass breakage.

Curves f1 and f2 are given by the following equations:

$$E_1=471.288*\exp(-0.0294*Y_1)+10; \ (39 \leq Y1 \leq 520) \quad \text{f1:}$$

$$E_1=1.941e5*\exp(-0.0336*Y1)+48; \ (223 \leq Y1 \leq 520) \quad \text{f2}$$

When the yield strength and Young's modulus of the support member 64 are on or above curve f1 and on or below curve f2, then the glass article 50 including the support member 64 so configured should have a passing HIT performance. Within the shaded region are a first star representing an exemplary embodiment of an aluminum alloy support member 64 and a second star representing an exemplary embodiment of a magnesium alloy support member 64.

Figure 6A:
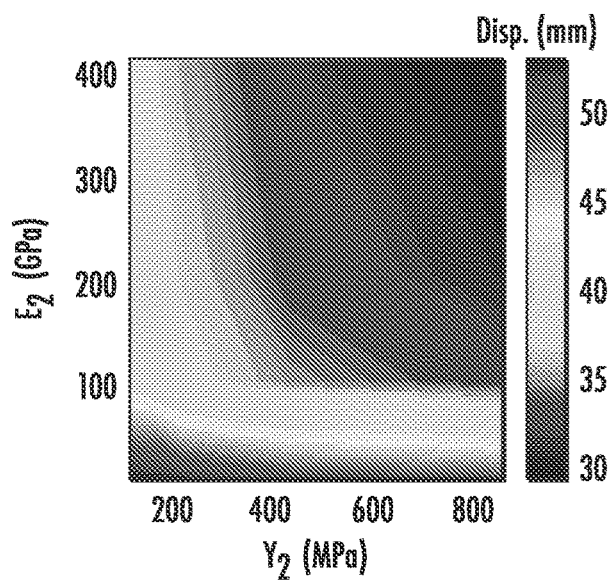
FIGS. 6A-6C depicts head-form impact testing performance based on head-form intrusion, deceleration, and maximum principal stress as a function of yield strength and Young's modulus of a mounting element of the glass article, according to exemplary embodiments.

A similar analysis was performed for the mounting element 72. In particular, FIGS. 6A-6C model HIT performance factors as a function of yield strength (x-axis) and Young's modulus (y-axis) for the mounting elements 72. For the simulations, the glass article 50 was modeled having an aluminum alloy support member 64 with a stiffness of about 320 N/mm. FIG. 6A depicts the intrusion of the glass sheet based on the yield strength and Young's modulus. Again, intrusion should be kept below 50 mm. FIG. 6A shows that a Young's modulus of about 20 GPa and above tends to keep the intrusion at 50 mm or less. FIG. 6A also depicts that the effect of Young's modulus drops off between about 200 MPa and 400 MPa. Thus, the design window based on intrusion is substantially open at any yield strength (within the scale depicted) when the Young's modulus is greater than about 20 GPa, and the design window for the Young's modulus opens wider as the yield strength increases from 200 MPa to 400 MPa.

Figure 6B:
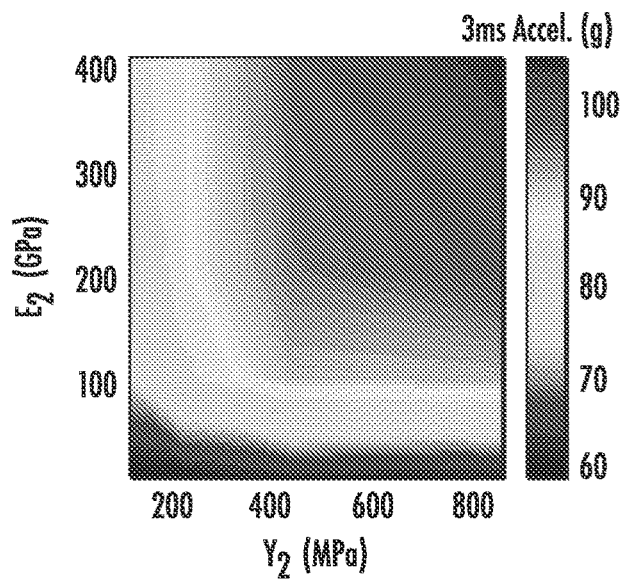

FIG. 6B depicts the HIT performance factor of maximum force continuously during 3 ms deceleration of a headform. Again, the maximum force over 3 ms should be 80 g or less. FIG. 6B demonstrates that the maximum force can be kept below 80 g when the yield strength is less than about 150 MPa with no restriction on the Young's modulus (at least with respect to the scale depicted). FIG. 6B also demonstrates that the maximum force can be kept below 80 g when the Young's modulus is less than about 85 GPa with no restriction on the yield strength (at least with respect to the scale depicted). Thus, the window of design with respect to maximum force over 3 ms during deceleration is the area of the graph to the inside of yield strength <150 MPa and Young's modulus <85 GPa.

Figure 6C:
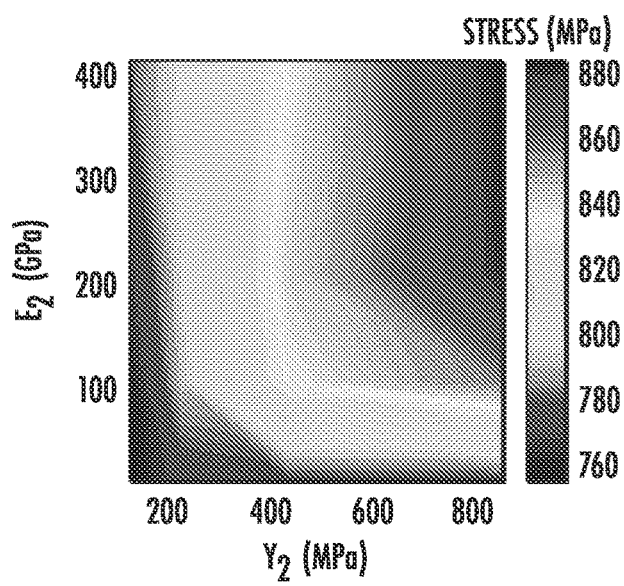

FIG. 6C depicts the HIT performance factor of maximum principal stress on the glass sheet. Again, the maximum principal stress on the glass sheet should kept below 800 MPa. In the graph of FIG. 6C, the maximum principal stress is generally kept below 800 MPa when the Young's modulus is below about 50 GPa without limitation on yield strength (at least within the scale depicted). Further, the maximum principal stress is generally kept below 800 MPa when the yield strength is less than about 275 MPa without limitation on Young's modulus (at least within the scale depicted)

Figure 7:
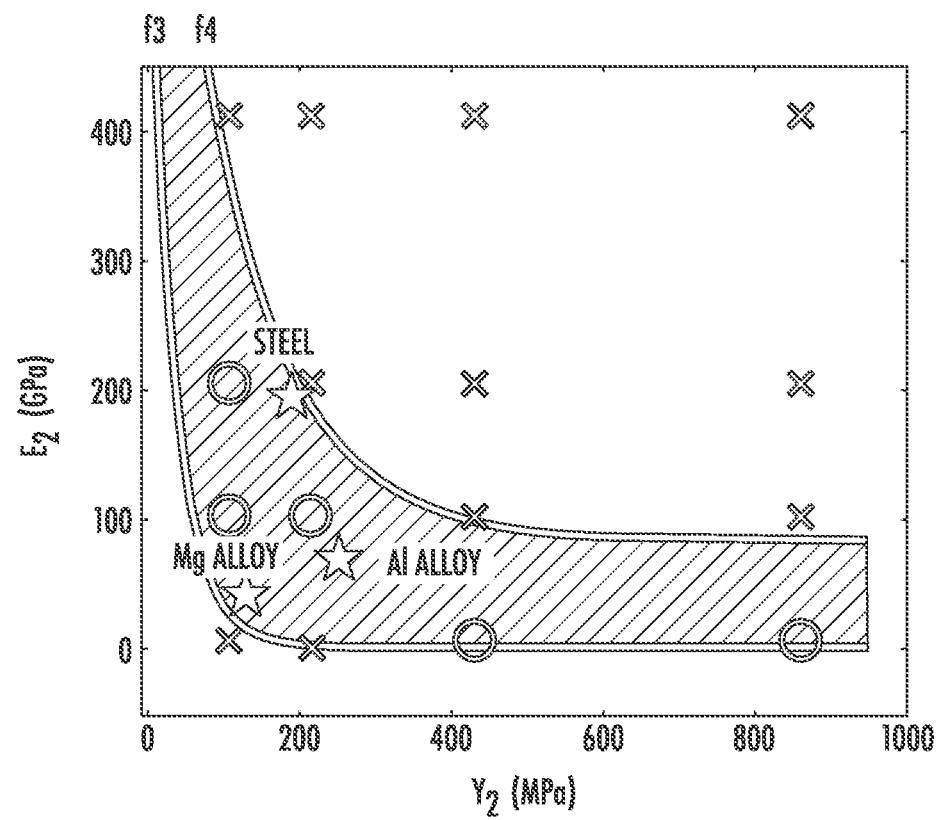
FIG. 7 depicts a graphical representation of a design window for passing head-form impact testing performance for the mounting element, according to exemplary embodiments.

Using the information generated in FIGS. 6A-6C, the HIT performance of a glass article 50 (as shown in FIGS. 3A and 3B) was simulated for mounting elements 72 having various combinations of Young's modulus ($E_2$) and yield strength ($Y_2$). FIG. 7 depicts the results of the simulations in which combinations of Young's modulus and yield strength that pass HIT are shown by circles and combinations of Young's modulus and yield strength that do not pass HIT are shown by x's. The shaded area between the two curves f3 and f4 represent the design window in terms of Young's modulus (in GPa) and yield strength (in MPa) for mounting elements 72 that will pass HIT.

Curves f3 and f4 are given by the following equations:

$$E_2=605.1203*\exp(-0.0303*Y_2)+3.9; \ (10 \leq Y2 \leq 950) \quad \text{f3:}$$

$$E_2=765.0928*\exp(-0.0094*Y2)+85; \ (78 \leq Y2 \leq 950) \quad \text{f4:}$$

When the yield strength and Young's modulus of the mounting elements 72 are on or above curve f3 and on or below curve f4, then the glass article 50 including mounting elements 72 so configured should have a passing HIT performance. Within the shaded region are a first star representing an exemplary embodiment of steel mounting elements 72, a second star representing an exemplary embodiment of magnesium alloy mounting elements, and a third star representing an exemplary embodiment of aluminum alloy mounting elements 72.

From FIGS. 5 and 7, certain observations can be made. In particular, when the yield strength of the support member 64 increased, the relative stiffness increased, which decreased the maximum intrusion and increased deceleration of the head form. The maximum principal stress on the glass sheet 52 varied only limitedly in response to the increase in the yield strength of the support member 64. Further, when the Young's modulus of the support member increased, the relative stiffness increased, which decreased the maximum intrusion and increased deceleration of the head form. Also, the maximum principal stress on the glass sheet 52 decreased. With respect to the mounting elements 72, when the yield strength increased, the relative stiffness increased, which decreased maximum intrusion and increased deceleration of the head form. Further, the maximum principal stress on the glass sheet increased. When the Young's modulus of the mounting elements 72 increased, the relative stiffness increased, which decreased the maximum intrusion and increased the deceleration of the head form. The maximum principal stress on the glass sheet 52 again increased.

Figure 8:
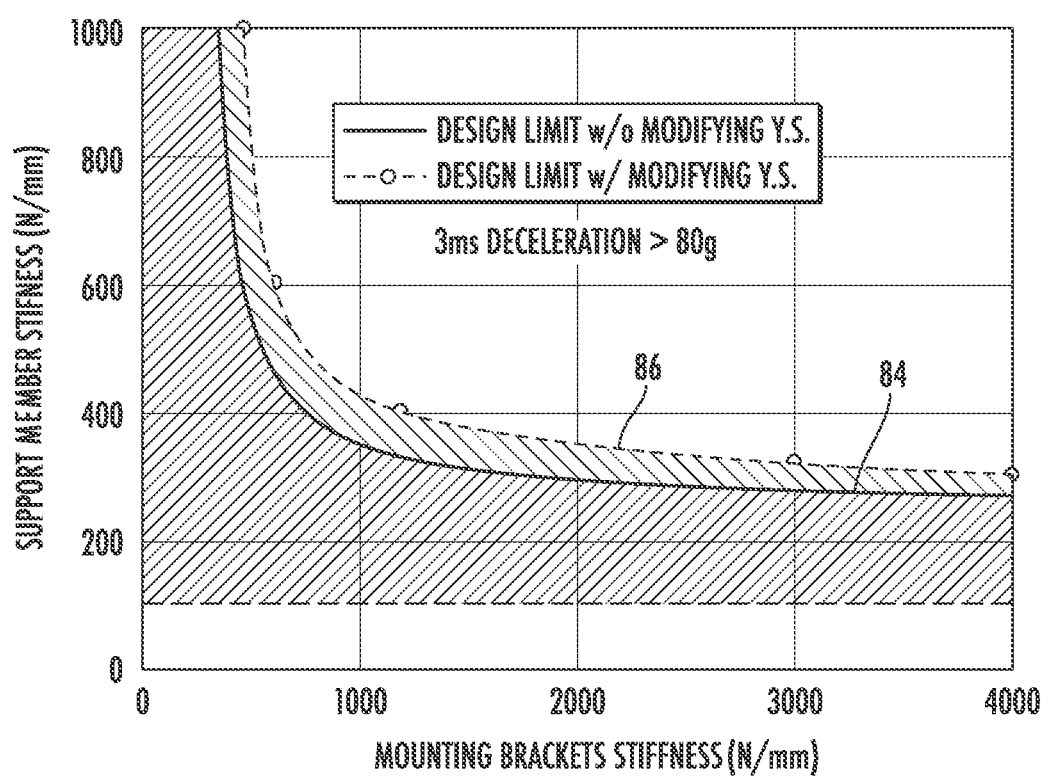
FIG. 8 depicts a graphical representation of a design window for passing head-form impact testing performance for a glass article considering both the support member and the mounting element, according to exemplary embodiments.

Further, from the design windows shown in FIGS. 5 and 7, an overall design window for passing HIT performance is shown in FIG. 8, specifically designs in which deceleration is not more than 80 g continuously for 3 ms and in which the maximum principal stress is less than 800 MPa. As can be seen in FIG. 8, the design window is shown in terms of the stiffness of the mounting elements 72 (i.e., mounting brackets 76 for the embodiments modeled) and the support member 64. In FIG. 8, the first curve 84 considers passing HIT performance without considering the contribution of yield strength to the response of the glass article 50 to HIT. In particular, the passing designs beneath the first curve 84 is generated based on a maximum effective stiffness (K₂) of 270 N/mm according to the Equation 3, below:

$$K_S = \frac{K_2 K_1}{K_2 + K_1} \quad (3)$$

in which $K_1$ and $K_2$ are the stiffnesses of the support member and mounting elements. By also considering the contribution of yield strength as described herein, the design window is broadened out past an effective stiffness of 270 N/mm to the second curve 86. That is, by considering the elastic limits of deformation for the support member 64 and the mounting element 72, the window for designs that pass HIT, including without glass breakage, is expanded to the area beneath the curve 86 to allow for more design flexibility.

Figure 9:
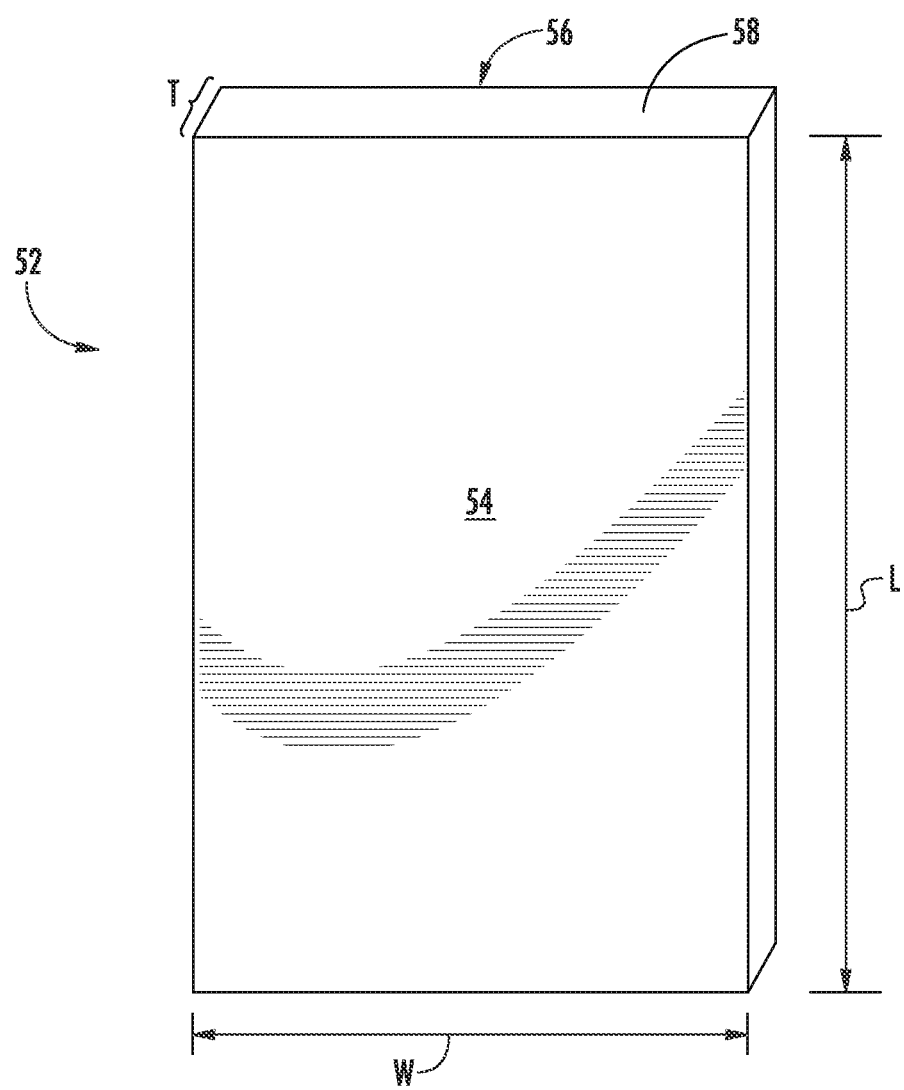
FIG. 9 depicts a glass sheet suitable for cold-forming to produce a glass article, according to an exemplary embodiment.

In the following paragraphs, various geometrical, mechanical, and strengthening properties of the glass sheet 52 as well as compositions of the glass sheet are provided. Referring to FIG. 9, additional structural details of glass sheet 52 are shown and described. As noted above, glass sheet 52 has a thickness T that is substantially constant and is defined as a distance between the first major surface 54 and the second major surface 56. In various embodiments, T may refer to an average thickness or a maximum thickness of the glass sheet. In addition, glass sheet 52 includes a width W defined as a first maximum dimension of one of the first or second major surfaces 54, 56 orthogonal to the thickness T, and a length L defined as a second maximum dimension of one of the first or second major surfaces 54, 56 orthogonal to both the thickness and the width. In other embodiments, W and L may be the average width and the average length of glass sheet 52, respectively.

In various embodiments, average or maximum thickness T is in the range of 0.3 mm to 2 mm. In various embodiments, width W is in a range from 5 cm to 250 cm, and length L is in a range from about 5 cm to about 1500 cm. As mentioned above, the radius of curvature (e.g., R as shown in FIGS. 2A and 2B) of glass sheet 52 is about 30 mm to about 1000 mm.

In embodiments, the glass sheet 52 may be strengthened. In one or more embodiments, glass sheet 52 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In various embodiments, glass sheet 52 may be strengthened mechanically by utilizing a mismatch of the coefficient of thermal expansion between portions of the article to create a compressive stress region and a central region exhibiting a tensile stress. In some embodiments, the glass sheet may be strengthened thermally by heating the glass to a temperature above the glass transition point and then rapidly quenching.

In various embodiments, glass sheet 52 may be chemically strengthened by ion exchange. In the ion exchange process, ions at or near the surface of the glass sheet are replaced by—or exchanged with—larger ions having the same valence or oxidation state. In those embodiments in which the glass sheet comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass sheet generate a stress.

Ion exchange processes are typically carried out by immersing a glass sheet in a molten salt bath (or two or more molten salt baths) containing the larger ions to be exchanged with the smaller ions in the glass sheet. It should be noted that aqueous salt baths may also be utilized. In addition, the composition of the bath(s) may include more than one type of larger ions (e.g., $Na^+$ and $K^+$) or a single larger ion. It will be appreciated by those skilled in the art that parameters for the ion exchange process, including, but not limited to, bath composition and temperature, immersion time, the number of immersions of the glass sheet in a salt bath (or baths), use of multiple salt baths, additional steps such as annealing, washing, and the like, are generally determined by the composition of the glass sheet (including the structure of the article and any crystalline phases present) and the desired DOC and CS of the glass sheet that results from strengthening. Exemplary molten bath compositions may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass sheet thickness, bath temperature and glass (or monovalent ion) diffusivity. However, temperatures and immersion times different from those described above may also be used.

In one or more embodiments, the glass sheet 52 may be immersed in a molten salt bath of 100% $NaNO_3$, 100% $KNO_3$, or a combination of $NaNO_3$ and $KNO_3$ having a temperature from about 370° C. to about 480° C. In some embodiments, the glass sheet may be immersed in a molten mixed salt bath including from about 5% to about 90% $KNO_3$ and from about 10% to about 95% $NaNO_3$. In one or more embodiments, the glass sheet may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass sheet may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass sheet. The spike may result in a greater surface CS value. This spike can be achieved by a single bath or multiple baths, with the bath(s) having a single composition or mixed composition, due to the unique properties of the glass compositions used in the glass sheets described herein.

In one or more embodiments, where more than one monovalent ion is exchanged into the glass sheet, the different monovalent ions may exchange to different depths within the glass sheet (and generate different magnitudes stresses within the glass sheet at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass sheet. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass sheet is chemically strengthened by an ion exchange treatment, FSM or SCALP may be used depending on which ion is exchanged into the glass sheet. Where the stress in the glass sheet is generated by exchanging potassium ions into the glass sheet, FSM is used to measure DOC. Where the stress is generated by exchanging sodium ions into the glass sheet, SCALP is used to measure DOC. Where the stress in the glass sheet is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass sheets is measured by FSM. Central tension or CT is the maximum tensile stress and is measured by SCALP.

In one or more embodiments, the glass sheet may be strengthened to exhibit a DOC that is described as a fraction of the thickness T of the glass sheet (as described herein). For example, in one or more embodiments, the DOC may be in the range of about 0.05T to about 0.25T. In some instances, the DOC may be in the range of about 20 µm to about 300 µm. In one or more embodiments, the strengthened glass sheet 52 may have a CS (which may be found at the surface or a depth within the glass sheet) of about 200 MPa or greater, about 500 MPa or greater, or about 1050 MPa or greater. In one or more embodiments, the strengthened glass sheet may have a maximum tensile stress or central tension (CT) in the range of about 20 MPa to about 100 MPa.

Suitable glass compositions for use as glass sheet 52 include soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %. In one or more embodiments, the glass composition includes $Al_2O_3$ in an amount of about 3 mol % to about 15 mol %. In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass.

In one or more embodiments, the glass composition comprises $B_2O_3$ in an amount in the range of about 0.01 mol % to about 5 mol %. However, in one or more embodiments, the glass composition is substantially free of $B_2O_3$. As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ in an amount of about 0.01 mol % to 2 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is in a range from about 8 mol % to about 20 mol %. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount in a range from about from about 8 mol % to about 20 mol %. In one or more embodiments, the glass composition includes $K_2O$ in an amount in a range from about 0 mol % to about 4 mol %. In one or more embodiments, the glass composition may be substantially free of $K_2O$. In one or more embodiments, the glass composition is substantially free of $Li_2O$. In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %. In one or more embodiments, the glass composition includes CaO in an amount less than about 1 mol %. In one or more embodiments, the glass composition is substantially free of CaO. In some embodiments, the glass composition comprises MgO in an amount from about 0 mol % to about 7 mol %.

In one or more embodiments, the glass composition comprises $ZrO_2$ in an amount equal to or less than about 0.2 mol %. In one or more embodiments, the glass composition comprises $SnO_2$ in an amount equal to or less than about 0.2 mol %.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to 1 mol %. Where the glass composition includes $TiO_2$, $TiO_2$ may be present in an amount of about 5 mol % or less.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein. It should be understood, that while the preceding glass composition paragraphs express approximate ranges, in other embodiments, glass sheet 52 may be made from any glass composition falling with any one of the exact numerical ranges discussed above.

Aspect (1) of this disclosure pertains to a glass article for a vehicle interior system, comprising: a glass sheet comprising a first major surface and a second major surface, the second major surface being opposite to the first major surface; a support member comprising a first support surface and a second support surface, the second support surface being opposite to the first support surface, wherein the glass sheet is disposed on the first support surface; and a mounting element disposed on the second support surface of the support member; wherein the support member comprises a first Young's modulus ($E_1$) in GPa and a first yield strength ($Y_1$) in MPa, wherein $E_1 \geq 471.288*exp(-0.0294*Y_1)+10$ for a first yield strength ($Y_1$) from 39 MPa to 520 MPa and wherein $E_1 \leq 1.941e5*exp(-0.0336*Y_1)+48$ for a first yield strength ($Y_1$) from 223 MPa to 520 MPa; wherein the mounting element comprises a second Young's modulus ($E_2$) in GPa and a second yield strength ($Y_2$) in MPa, wherein $E_2 \geq 605.1203*exp(-0.0303*Y_2)+3.9$ for a second yield strength ($Y_2$) from 10 MPa to 950 MPa and wherein $E_2 \leq 765.0928*exp(-0.0094*Y_2)+85$ for a second yield strength ($Y_2$) from 78 MPa to 950 MPa.

Aspect (2) pertains to the glass article of Aspect (1), wherein the support member comprises a first stiffness of at least 100 N/mm.

Aspect (3) pertains to the glass article of Aspect (1) or Aspect (2), wherein, when the glass article is subjected to headform impact testing according to FMVSS 201, the headform does not exceed 80 g deceleration continuously for more than 3 ms.

Aspect (4) pertains to the glass article of Aspect (3), wherein the glass sheet deflects less than 50 mm when subjected to headform impact testing.

Aspect (5) pertains to the glass article of Aspect (3) or Aspect (4), wherein the glass sheet does not break after headform impact testing.

Aspect (6) pertains to the glass article of any one of Aspects (3) through (5), wherein the glass sheet does not experience a maximum principal stress of more than 800 MPa on the first major surface or on the second major surface during headform impact testing.

Aspect (7) pertains to the glass article of any one of Aspects (1) through (6), wherein the mounting element comprises a plurality of mounting brackets configured for attachment to the vehicle interior system.

Aspect (8) pertains to the glass article of Aspect (7), wherein each mounting bracket of the plurality of mounting brackets comprises a first arm, a second arm, and a cross-member joining the first arm and the second arm and wherein the second arm is connected to the second support surface of the support member and the first arm is configured for attachment to the vehicle interior system.

Aspect (9) pertains to the glass article of any one of Aspects (1) through (8), wherein the glass sheet comprises a glass thickness between the first major surface and the second major surface of 0.3 mm to 2.0 mm.

Aspect (10) pertains to the glass article of any one of Aspects (1) through (9), wherein the glass sheet is thermally or chemically strengthened.

Aspect (11) pertains to the glass article of Aspect (10), wherein the glass sheet comprises a soda lime glass, an aluminosilicate glass, a borosilicate glass, a boroaluminosilicate glass, an alkali-containing aluminosilicate glass, an alkali-containing borosilicate glass, or an alkali-containing boroaluminosilicate glass.

Aspect (12) pertains to the glass article of any one of Aspects (1) through (11), further comprising a display unit disposed on the second major surface of the glass sheet.

Aspect (13) pertains to the glass article of Aspect (12), wherein the display unit comprises at least one of a light-emitting diode (LED) display, an organic LED (OLED) display, a microLED display, a plasma display, a liquid crystal display (LCD), or an organic LCD.

Aspect (14) pertains to the glass article of any one of Aspects (1) through (13), wherein the first support surface of the support member comprises a curvature and wherein the glass sheet is cold-formed into conformity with the curvature of the support member.

Aspect (15) pertains to the glass article of any one of Aspects (1) through (14), wherein an effective stiffness of the mounting element and the support member is greater than 270 N/mm.

Aspect (16) of this disclosure pertains to a glass article for a vehicle interior system, comprising: a glass sheet comprising a first major surface and a second major surface, the second major surface being opposite to the first major surface; a support member comprising a first support surface and a second support surface, the second support surface being opposite to the first support surface, wherein the glass sheet is disposed on the first support surface; and a mounting element disposed on the second support surface of the support member; wherein, when the glass article is subjected to headform impact testing according to FMVSS 201, the headform does not exceed 80 g deceleration continuously for more than 3 ms; and wherein the glass sheet deflects less than 50 mm when subjected to the headform impact testing.

Aspect (17) pertains to the glass article of Aspect (16), wherein the support member comprises a first Young's modulus (E1) in GPa and a first yield strength (Y1) in MPa, wherein $E1 > 471.288*exp(-0.0294*Y1)+10$ for a first yield strength (Y1) from 39 MPa to 520 MPa and wherein $E1 \leq 1.941e5*exp(-0.0336*Y1)+48$ for a first yield strength (Y1) from 223 MPa to 520 MPa.

Aspect (18) pertains to the glass article of Aspect (16) or Aspect (17), wherein the mounting element comprises a second Young's modulus (E2) in GPa and a second yield strength (Y2) in MPa, wherein $E2 > 605.1203*exp(-0.0303*Y2)+3.9$ for a second yield strength (Y2) from 10 MPa to 950 MPa and wherein $E2 \leq 765.0928*exp(-0.0094*Y2)+85$ for a second yield strength (Y2) from 78 MPa to 950 MPa.

Aspect (19) pertains to the glass article of any one of Aspects (16) through (18), wherein the glass sheet does not experience a maximum principal stress of more than 800 MPa on the first major surface or on the second major surface during headform impact testing.

Aspect (20) pertains to the glass article of any one of Aspects (16) through (19), wherein the glass sheet does not break after headform impact testing.

Aspect (21) pertains to the glass article of any one of Aspects (16) through (20), further comprising a display unit disposed on the second major surface of the glass sheet.

Aspect (22) pertains to the glass article of any one of Aspects (16) through (21), wherein the mounting element comprises a plurality of mounting brackets configured for attachment to the vehicle interior system.

Aspect (23) pertains to the glass article of Aspect (22), wherein each mounting bracket comprises a first arm, a second arm, and a cross-member joining the first arm and the second arm and wherein the second arm is connected to the support member and the first arm is configured for attachment to the vehicle interior system.

Aspect (24) pertains to the glass article of any one of Aspects (16) through (23), wherein the support member and the mounting element comprise an effective stiffness of greater than 270 N/mm.

Aspect (25) pertains to a method of manufacturing a glass article, the glass article comprising a glass sheet having a first major surface and a second major surface, a support member having a first support surface and a second support surface, and a mounting element, the method comprising the steps of: adhering the second major surface of the glass sheet to first support surface of the support member; wherein the mounting element is attached to the second support surface of the support member; wherein the support member comprises a first Young's modulus (E1) in GPa and a first yield strength (Y1) in MPa, wherein $E1 > 471.288*\exp(-0.0294*Y1)+10$ for a first yield strength (Y1) from 39 MPa to 520 MPa and wherein $E1 \leq 1.941e5*\exp(-0.0336*Y1)+48$ for a first yield strength (Y1) from 223 MPa to 520 MPa; and wherein the mounting element comprises a second Young's modulus (E2) in GPa and a second yield strength (Y2) in MPa, wherein $E2 > 605.1203*\exp(-0.0303*Y2)+3.9$ for a second yield strength (Y2) from 10 MPa to 950 MPa and wherein $E2 \leq 765.0928*\exp(-0.0094*Y2)+85$ for a second yield strength (Y2) from 78 MPa to 950 MPa.

Aspect (26) pertains to the method of Aspect (25), wherein, when the glass article is subjected to headform impact testing according to at least one of FMVSS 201, the headform does not exceed 80 g deceleration continuously for more than 3 ms.

Aspect (27) pertains to the method of Aspect (26), wherein the glass sheet deflects less than 50 mm when subjected to the headform impact testing.

Aspect (28) pertains to the method of Aspect (26) or Aspect (27), wherein the glass sheet does not experience a maximum principal stress of more than 800 MPa on the first major surface or the second major surface during headform impact testing.

Aspect (29) pertains to the method of any one of Aspects (25) through (28), wherein the first support surface of the support member comprises a curvature and wherein, prior to the step of adhering, the method further comprises the step of: bending the glass sheet into conformity with a curved surface of a process chuck at a temperature of 200° C. or less.

Aspect (30) pertains to the method of any one of Aspects (25) through (29), wherein the support member comprises a first stiffness of at least 100 N/mm.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A glass article for a vehicle interior system, comprising:
   a glass sheet comprising a first major surface and a second major surface, the second major surface being opposite to the first major surface;
   a support member comprising a first support surface and a second support surface, the second support surface being opposite to the first support surface, wherein the glass sheet is disposed on the first support surface; and
   a mounting element disposed on the second support surface of the support member;
   wherein the support member comprises a first Young's modulus ($E_1$) in GPa and a first yield strength ($Y_1$) in MPa, wherein $E_1 \geq 471.288*\exp(-0.0294*Y_1)+10$ for a first yield strength ($Y_1$) from 39 MPa to 520 MPa and wherein $E_1 \leq 1.941e5*\exp(-0.0336*Y_1)+48$ for a first yield strength ($Y_1$) from 223 MPa to 520 MPa;
   wherein the mounting element comprises a second Young's modulus ($E_2$) in GPa and a second yield strength ($Y_2$) in MPa, wherein $E_2 \geq 605.1203*\exp(-0.0303*Y_2)+3.9$ for a second yield strength ($Y_2$) from 10 MPa to 950 MPa and wherein $E_2 \leq 765.0928*\exp(-0.0094*Y_2)+85$ for a second yield strength ($Y_2$) from 78 MPa to 950 MPa.

2. The glass article of claim 1, wherein the support member comprises a first stiffness of at least 100 N/mm.

3. The glass article according to claim 1, wherein, when the glass article is subjected to headform impact testing according to FMVSS 201, the headform does not exceed 80 g deceleration continuously for more than 3 ms.

4. The glass article according to claim 3, wherein the glass sheet deflects less than 50 mm when subjected to headform impact testing.

5. The glass article according to claim 3, wherein the glass sheet does not break after headform impact testing.

6. The glass article according to claim 3, wherein the glass sheet does not experience a maximum principal stress of more than 800 MPa on the first major surface or on the second major surface during headform impact testing.

7. The glass article according to claim 1, wherein the mounting element comprises a plurality of mounting brackets configured for attachment to the vehicle interior system.

8. The glass article of claim 7, wherein each mounting bracket of the plurality of mounting brackets comprises a first arm, a second arm, and a cross-member joining the first arm and the second arm and wherein the second arm is connected to the second support surface of the support member and the first arm is configured for attachment to the vehicle interior system.

9. The glass article according to claim 1, wherein the glass sheet comprises a glass thickness between the first major surface and the second major surface of 0.3 mm to 2.0 mm.

10. The glass article according to claim 1, further comprising a display unit disposed on the second major surface of the glass sheet, wherein the display unit comprises at least one of a light-emitting diode (LED) display, an organic LED (OLED) display, a micro LED display, a plasma display, a liquid crystal display (LCD), or an organic LCD.

11. The glass article according to claim 1, wherein the first support surface of the support member comprises a curvature and wherein the glass sheet is cold-formed into conformity with the curvature of the support member.

12. The glass article according to claim 1, wherein an effective stiffness of the mounting element and the support member is greater than 270 N/mm.

13. A glass article for a vehicle interior system, comprising:
a glass sheet comprising a first major surface and a second major surface, the second major surface being opposite to the first major surface;
a support member comprising a first support surface and a second support surface, the second support surface being opposite to the first support surface, wherein the glass sheet is disposed on the first support surface; and
a mounting element disposed on the second support surface of the support member, wherein the mounting element comprises a plurality of mounting brackets configured for attachment to the vehicle interior system;
wherein, when the glass article is subjected to headform impact testing according to FMVSS 201, the headform does not exceed 80 g deceleration continuously for more than 3 ms; and
wherein the glass sheet deflects less than 50 mm when subjected to the headform impact testing.

14. The glass article according to claim 13, wherein the support member comprises a first Young's modulus ($E_1$) in GPa and a first yield strength ($Y_1$) in MPa, wherein $E_1 \geq 471.288*\exp(-0.0294*Y_1)+10$ for a first yield strength ($Y_1$) from 39 MPa to 520 MPa and wherein $E_1 \leq 1.941e5*\exp(-0.0336*Y_1)+48$ for a first yield strength ($Y_1$) from 223 MPa to 520 MPa.

15. The glass article according to claim 13, wherein the mounting element comprises a second Young's modulus ($E_2$) in GPa and a second yield strength ($Y_2$) in MPa, wherein $E_2 \geq 605.1203*\exp(-0.0303*Y_2)+3.9$ for a second yield strength ($Y_2$) from 10 MPa to 950 MPa and wherein $E_2 \leq 765.0928*\exp(-0.0094*Y_2)+85$ for a second yield strength ($Y_2$) from 78 MPa to 950 MPa.

16. The glass article according to claim 13, wherein the glass sheet does not experience a maximum principal stress of more than 800 MPa on the first major surface or on the second major surface during headform impact testing.

17. The glass article according to claim 13, wherein each mounting bracket comprises a first arm, a second arm, and a cross-member joining the first arm and the second arm and wherein the second arm is connected to the support member and the first arm is configured for attachment to the vehicle interior system.

18. The glass article according to claim 13, wherein the support member and the mounting element comprise an effective stiffness of greater than 270 N/mm.

19. A method of manufacturing a glass article, the glass article comprising a glass sheet having a first major surface and a second major surface, a support member having a first support surface and a second support surface, and a mounting element, the method comprising the steps of:
adhering the second major surface of the glass sheet to first support surface of the support member;
wherein the mounting element is attached to the second support surface of the support member;
wherein the support member comprises a first Young's modulus ($E_1$) in GPa and a first yield strength ($Y_1$) in MPa, wherein $E_1 \geq 471.288*\exp(-0.0294*Y_1)+10$ for a first yield strength ($Y_1$) from 39 MPa to 520 MPa and wherein $E_1 \leq 1.941e5*\exp(-0.0336*Y_1)+48$ for a first yield strength ($Y_1$) from 223 MPa to 520 MPa; and
wherein the mounting element comprises a second Young's modulus ($E_2$) in GPa and a second yield strength ($Y_2$) in MPa, wherein $E_2 \geq 605.1203*\exp(-0.0303*Y_2)+3.9$ for a second yield strength ($Y_2$) from 10 MPa to 950 MPa and wherein $E_2 \leq 765.0928*\exp(-0.0094*Y_2)+85$ for a second yield strength ($Y_2$) from 78 MPa to 950 MPa.

20. The method of claim 19, wherein, when the glass article is subjected to headform impact testing according to at least one of FMVSS 201, the headform does not exceed 80 g deceleration continuously for more than 3 ms.

* * * * *